March 15, 1927.  R. E. LEE  1,621,120
HOME TRAINER
Filed Sept. 10, 1925
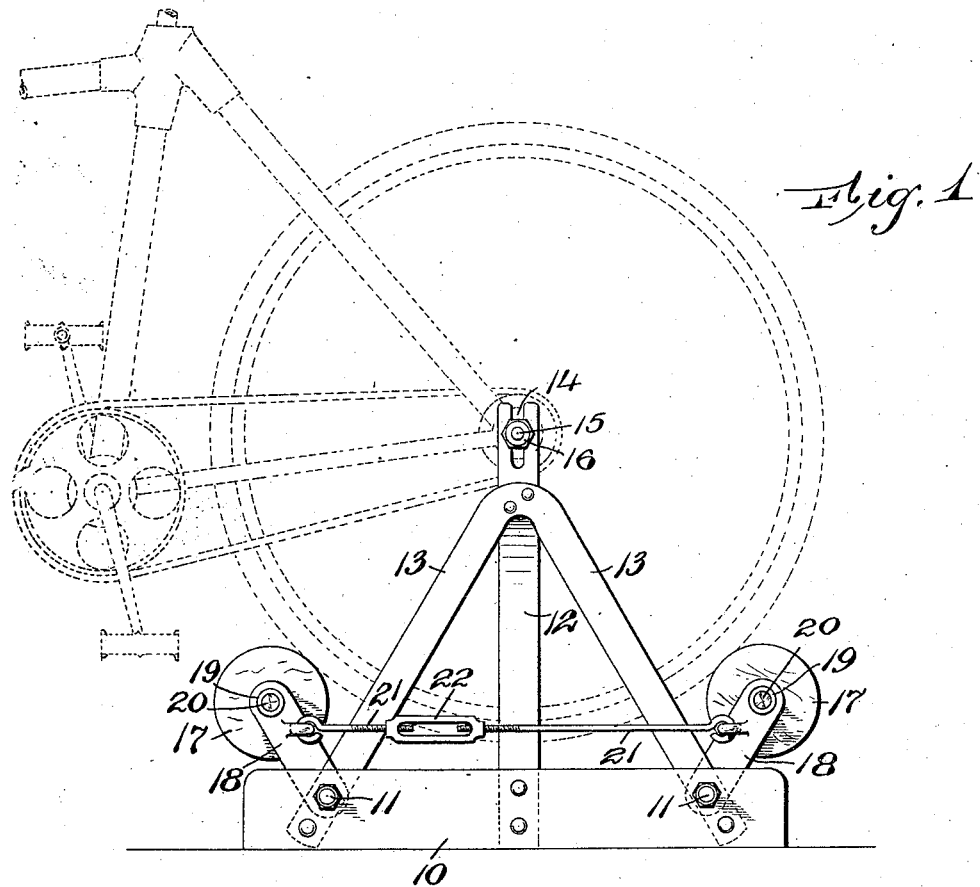
Fig. 1
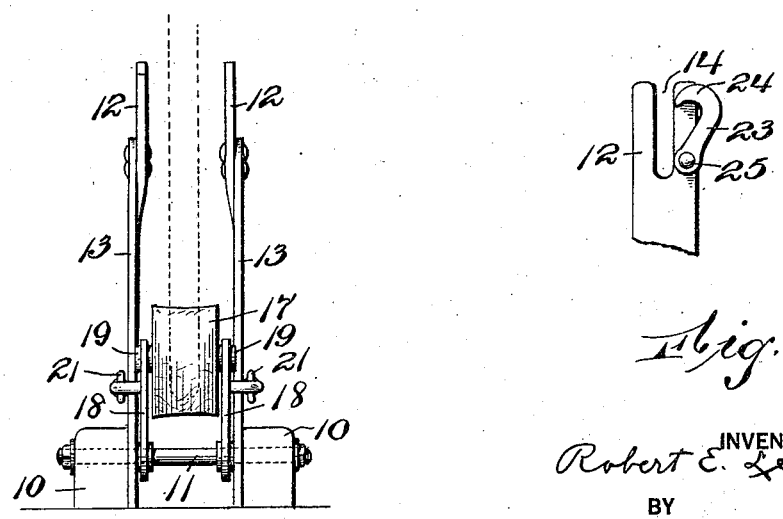
Fig. 2
Fig. 3
INVENTOR
Robert E. Lee,
BY
Wm H Caufield
ATTORNEY Patented Mar. 15, 1927.

1,621,120

UNITED STATES PATENT OFFICE.

ROBERT E. LEE, OF HILLSIDE, NEW JERSEY.

HOME TRAINER.

Application filed September 10, 1925. Serial No. 55,453.

This invention relates to an improved home trainer which takes up but little room and which will rigidly support the rear end of a bicycle so that the rider can be assured of his safety and at the same time exercise with any degree of speed he desires.

The invention is designed to provide a device of this kind in which the pressure against the tire of the rear wheel can be adjusted and regulated so as to provide either light or strenuous exercise.

The invention is illustrated in the accompanying drawing, in which Figure 1 is a side view of the device, showing the rear part of a bicycle in dotted outline. Figure 2 is an end view of the device. Figure 3 is a detail view of a modified form of axle holding means.

The device has a suitable base, the form shown consisting of parallel beams or stringers 10 held in substantially parallel relation by the bolts 11 and having enough length to provide a solid and stable support. On the base is arranged a suitable frame which, with the base, constitutes a stand for the rear wheel of a bicycle, the form shown consisting of uprights 12 extending from each beam 10 and being held by braces 13 to provide rigidity to the uprights 12, the uprights being adapted to receive the rear axle of a bicycle, the slots 14 in the uprights receiving the axle 15, the axle being held against vertical movement by suitable clamping means, such as nuts 16.

The amount of exercise that the rider desires can be regulated so that the training can assume either straight smooth riding, or the pressure can be applied so as to provide exercise equivalent to hill climbing. To provide for this I employ a pair of rollers 17 which are adapted to be moved toward each other and held in such adjusted position, one being placed in rear of and one being placed in front of the central axis, or rather the plane of the axle of the rear wheel, one form of providing such adjustment consisting of the arms 18 which are provided with bearings 19 in which the axles 20 of the rollers rotate and which are hinged at their other end so that they can swing, the bolts 11 providing convenient means for pivoting the arms 18 to the base.

The arms are connected by rods 21 and a turnbuckle 22 as typifying an adjusting means for drawing the rollers 17 toward each other or forcing them further apart and holding them in such adjusted position. It will be evident that with the axle 15 firmly held in position, drawing the rollers 17 toward each other will place more friction on the tire of the wheel and thus increase the exercise.

In Figure 3 I show a modified form of fastening means in which the upright 12 has a latch 23, the hook end 24 of which can be passed over the axle 15 of the bicycle when it is in the slot 14 and thus prevent any upward movement of the axle when an upward pressure is placed against the wheel by reason of the adjustment of the rollers 17. The latch 23 is hinged at 25 to the upright 12.

I claim:

1. A home trainer comprising a stand having means for securing the axle of a bicycle wheel, arms pivoted to the stand, rollers on said arms, and a connection to hold the rollers at various adjustable distances apart to vary their pressure on the tire of the wheel.

2. A home trainer comprising a stand having means for securing the axle of a bicycle wheel, arms pivoted to the stand, rollers on said arms, and rods and a turnbuckle connecting said arms to force the rollers against the tire of the wheel.

3. A home trainer comprising a base, spaced uprights on the base, the uprights having slots to receive the ends of the rear axle of a bicycle, arms hinged to the base and in front and rear of the standards, rollers supported by the arms, and means for connecting the rollers and varying the distance between them.

In testimony whereof I affix my signature.

ROBERT E. LEE.